United States Patent
Kitayama et al.

(10) Patent No.: US 8,953,645 B2
(45) Date of Patent: Feb. 10, 2015

(54) COMMUNICATION SYSTEM, COMMUNICATION APPARATUS AND TIME SYNCHRONIZATION METHOD

(75) Inventors: Kenji Kitayama, Tokyo (JP); Kazuyuki Kashima, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 191 days.

(21) Appl. No.: 13/509,305

(22) PCT Filed: Nov. 11, 2009

(86) PCT No.: PCT/JP2009/069209
§ 371 (c)(1),
(2), (4) Date: May 11, 2012

(87) PCT Pub. No.: WO2011/058625
PCT Pub. Date: May 19, 2011

(65) Prior Publication Data
US 2012/0224492 A1    Sep. 6, 2012

(51) Int. Cl.
*H04J 3/06* (2006.01)
*H04L 12/403* (2006.01)
(Continued)

(52) U.S. Cl.
CPC .......... *H04L 12/4035* (2013.01); *H04L 12/403* (2013.01); *H04L 12/4135* (2013.01); *H04L 12/42* (2013.01); *H04J 3/0641* (2013.01); *H04J 3/0667* (2013.01); *H04J 3/0673* (2013.01)
USPC ........................................ 370/503

(58) Field of Classification Search
USPC ......... 370/216, 222, 241, 242, 245, 249, 252, 370/254, 255, 258, 336, 464, 503; 455/39, 455/500, 502
See application file for complete search history.

(56) References Cited

U.S. PATENT DOCUMENTS 6,381,647 B1 *   4/2002   Darnell et al. ................ 709/232
2004/0141526 A1 *   7/2004   Balasubramanian et al. 370/503
(Continued)

FOREIGN PATENT DOCUMENTS

CN    101536423 A    9/2009
JP    5 167589    7/1993
(Continued)

OTHER PUBLICATIONS

"IEEE Standard for a Precision Clock Synchronization Protocol for Networked Measurement and Control Systems," IEEE Instrumentation and Measurement Society, pp. 16-40 (Jul. 24, 2008).
(Continued)

*Primary Examiner* — Edan Orgad
*Assistant Examiner* — Saumit Shah
(74) *Attorney, Agent, or Firm* — Oblon, Spivak, McClelland, Maier & Neustadt, L.L.P.

(57) ABSTRACT

A communication system that is constituted by a plurality of communication apparatuses, and performs time synchronization using a time synchronization frame, wherein one of the communication apparatuses is set as a starting point node, at least one of the communication apparatuses is set as a terminal point node, the starting point node generates a time synchronization frame in an outward-route direction and transmits the generated time synchronization frame in the outward-route direction, the terminal point node generates a time synchronization frame in a return-route direction and transmits the generated time synchronization frame in the return-route direction, and an intermediate node relays a received time synchronization frame when receiving a time synchronization frame transmitted in an outward-route direction and a return-route direction.

14 Claims, 9 Drawing Sheets

(51) Int. Cl.
*H04L 12/413* (2006.01)
*H04L 12/42* (2006.01)

(56) References Cited

U.S. PATENT DOCUMENTS

| | | | |
|---|---|---|---|
| 2004/0170184 A1* | 9/2004 | Hashimoto | 370/401 |
| 2006/0245454 A1* | 11/2006 | Balasubramanian et al. | 370/509 |
| 2008/0232525 A1 | 9/2008 | Nakayama et al. | |
| 2010/0085885 A1 | 4/2010 | Sakurada et al. | |
| 2010/0118721 A1 | 5/2010 | Sakurada et al. | |

FOREIGN PATENT DOCUMENTS

| | | |
|---|---|---|
| JP | 11 223687 | 8/1999 |
| JP | 11-298512 A | 10/1999 |
| JP | 11 355256 | 12/1999 |
| JP | 2007 189457 | 7/2007 |
| JP | 2008 72363 | 3/2008 |
| WO | 2008 129593 | 10/2008 |
| WO | 2008 129594 | 10/2008 |

OTHER PUBLICATIONS

International Search Report Issued Dec. 15, 2009 in PCT/JP09/069209 Filed Nov. 11, 2009.

Japanese Office Action issued May 21, 2013 in Patent Application No. 2011-540352 with Partial English Translation.

Combined Chinese Office Action and Search Report issued Feb. 24, 2014 in Patent Application No. 200980162405.2 (with partial English language translation and English translation of category of cited documents).

* cited by examiner

COMMUNICATION SYSTEM, COMMUNICATION APPARATUS AND TIME SYNCHRONIZATION METHOD

FIELD

The present invention relates to a communication system that performs time synchronization among a plurality of communication apparatuses.

BACKGROUND

For example, in an industrial network field for which high real-time performance is required, there has been a demand for temporally synchronizing control apparatuses so as to be able to control a plurality of control devices connected to a network as simultaneously as possible.

To realize temporal synchronization among apparatuses, IEEE (The Institute of Electrical and Electronics Engineers, Inc.) 1588 Standard described in Non Patent Literature 1 mentioned below is often used. The time synchronization method specified under IEEE 1588 (IEC (International Electrotechnical Commission) 61588) Standard is explained.

IEEE 1588 is a protocol standard designed for precision time synchronization based on Ethernet (registered trademark). IEEE 1588 is based on 1:1 time exchange between a time master node and a time slave node each having a precise clock.

First, a time synchronization sequence under IEEE 1588 is explained. The time synchronization under IEEE 1588 is realized by communication of two round trips. The time master node transmits a Sync message for time synchronization to the time slave node. At this time, the time master node holds a time of transmission of the Sync message. The time slave node holds a time of reception of the Sync message.

The time master node transmits a Follow-up message in which the time of transmission of the Synch message held by the time master node is stored to the time slave node. The time slave node synchronizes its own clock with the time of the time master node using the time of transmission included in the Follow-up message when the time slave node has already measured a propagation delay.

To measure the propagation delay, the time slave node transmits a Delay_Req message to the time master node. At this time, the time slave node holds a time of transmission of the Delay_Req message. The time master node holds a time of reception at which the time master node receives the Delay_Req message, stores the time of reception in a Delay_Res message, and transmits the Delay_Res message to the time slave node.

The time slave node calculates a time difference between a master clock and its own clock based on the time of transmission included in a Follow_up message, the time of reception at which the time slave node receives the Sync message, the time of transmission at which the time slave node transmits the Delay_Res message, and the time of reception stored in the Delay_Res message, and corrects the calculated time difference, thereby making synchronization with the time of the time master node.

The sequence described above is a sequence for 1:1 communication between a time master node and a time slave node. As methods of synchronizing a time of a plurality of time slave nodes with the time master node, there are two methods used, which are a boundary clock method and a transparent method.

In the boundary clock method, when the time slave node directly connected to the time master node completes synchronization with its own time with the time of the time master node according to the time synchronization sequence described above, this time slave node next becomes a subtime master node, and synchronizes its own time with the time of a time slave node just below the former subtime master node according to the above-mentioned time synchronization sequence. In this way, in the boundary clock method, time synchronization is sequentially performed, starting with the time master node. As a result, the time of the time master node is transmitted downstream.

On the other hand, in the transparent clock method, End-to-End time synchronization is performed between the time master node and the time slave nodes. In the transparent clock method, each of the nodes present halfway between the time master node and the time slave nodes measures its own delay based on a time synchronization message, and adds the measured delay to a correction field in the time synchronization message, so as to make relay. The time slave node that has received the time synchronization message corrects the time using the delay stored in the correction field and added by the node present halfway. As the time synchronization message, the message used in the time synchronization sequence described above is used. That is, the time synchronization sequence for each node is equivalent to a time synchronization sequence for the 1:1 communication mentioned above.

CITATION LIST

Non Patent Literature

Non Patent Literature 1: IEEE Std 1588-2008, "IEEE Standard for a Precision Clock Synchronization Protocol for Networked Measurement and Control", July 2008

SUMMARY

Technical Problem

However, according to the above conventional technique, when a plurality of time slave nodes are subjected to synchronization and the boundary clock method is used, all the nodes need to have a function as a time master node and a function as a time slave node. Therefore, it is necessary to make each node a multifunctional one, and this disadvantageously results in increase in hardware cost.

Furthermore, the transparent clock method has a problem that a frequency band used by a network increases as a result of transmission and reception of time synchronization messages. Particularly when high precision is required for the time synchronization, the frequency band used by the network further increases because of a great frequency of transmitting time synchronization messages.

Further, in both the boundary clock method and the transparent clock method, the time slave nodes perform time synchronization processings, respectively. For this reason, it disadvantageously takes a long time for time synchronization frames to arrive at all the time slave nodes, and thus it is difficult to accelerate the synchronization completion time of all the time slave nodes.

The present invention has been achieved in view of the above-mentioned circumstances, and an object of the present invention is to provide a communication system, a communication apparatus and a time synchronization method, which can make it unnecessary to make a time slave node a multifunctional one, save a band used by a network, and reduce the amount of time required until arrival of time synchronization frames.

Solution to Problem

In order to solve the above-mentioned problems and achieve the object, the invention provides a communication system that is constituted by a plurality of communication apparatuses, and performs time synchronization using a time synchronization frame transmitted in an outward-route direction and a return-route direction, wherein one of the communication apparatuses is set as a starting point node, and at least one of the communication apparatuses is set as a terminal point node, the starting point node generates a time synchronization frame in an outward-route direction, and transmits the generated time synchronization frame in the outward-route direction, the terminal point node generates a time synchronization frame in a return-route direction, and transmits the generated time synchronization frame in the return-route direction, and an intermediate node that is a communication apparatus among the communication apparatuses other than the starting point node and the terminal point node relays a received time synchronization frame when receiving a time synchronization frame transmitted in an outward-route direction and a return-route direction.

Advantageous Effects of Invention

The communication system, the communication apparatus and the time synchronization method according to the present invention do not need to make a time slave node a multifunctional one, can save a band used by a network, and can reduce the amount of time required until arrival of time synchronization frames.

DESCRIPTION OF EMBODIMENTS

Embodiments of a communication system, a communication apparatus, and a time synchronization method according to the present invention will be described below in detail with reference to the accompanying drawings. It is noted that the invention is not limited to these embodiments.

First Embodiment

Figure 1:
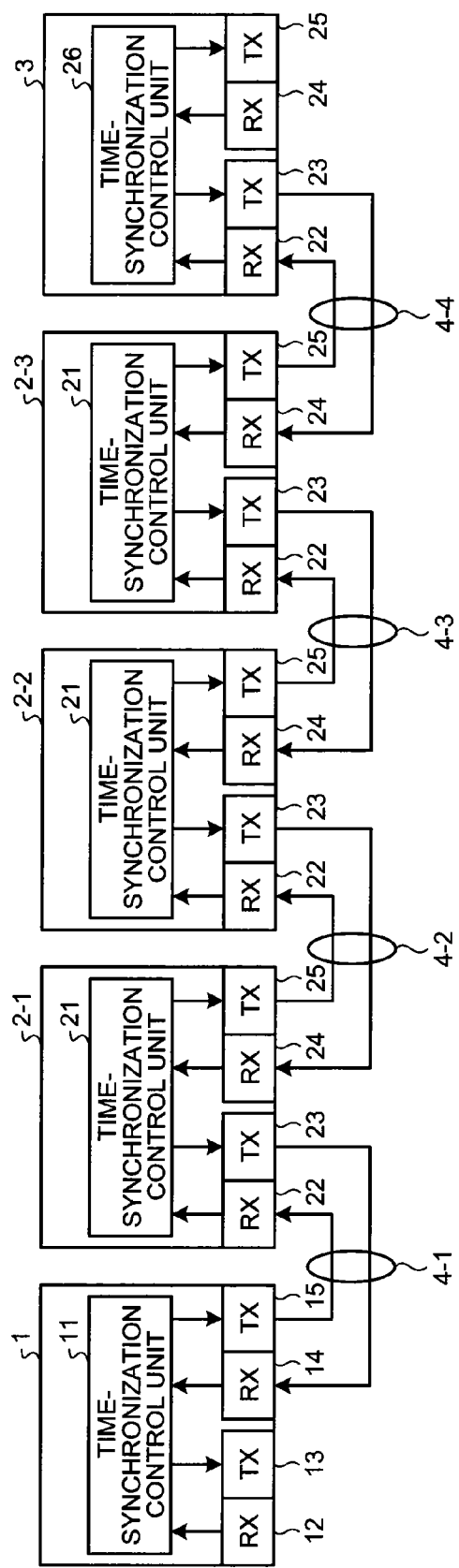
FIG. 1 is a diagram showing a configuration example of a communication system according to a first embodiment.

FIG. 1 is a diagram showing a configuration example of a communication system according to a first embodiment of the present invention. As shown in FIG. 1, the communication system according to the present embodiment constitutes a line network of a five-node configuration, and is comprised of a time master node 1, time slave nodes 2-1 to 2-3, and a time slave node 3. Note that such a line network can be any type of networks in which nodes are connected to one another either physically or logically.

The present embodiment is described taking the time slave nodes 2-1 to 2-3 as an example for a communication apparatus according to the present embodiment.

In the present embodiment, an example in which a protocol specified under IEEE 1588 is used for a time synchronization method is described. However, a usable protocol is not limited to the former. As long as the protocol is for a time synchronization method in which when it is assumed that an outward route and a return route are equal in a network propagation delay, time synchronization frames are transmitted respectively on the outward route and the return route, and differences between the respective reference times and their own times are calculated on the outward route and the return route, so as to eliminate the network propagation delay and then perform time synchronization, the protocol can be applied in the present embodiment.

The time master node (time master) 1 is a time master node for time synchronization. The time master node 1 is connected to a ground master clock using, for example, a GPS (Global Pointing System), and can recognize a time with high precision. As shown in FIG. 1, the time master node 1 is configured to include a time-synchronization control unit 11, RXs (reception processing units) 12 and 14 each performing a predetermined reception process on a received frame, and TXs (transmission processing units) 13 and 15 each performing a predetermined transmission process such as framing of transmitted data.

The time slave nodes (time slaves) 2-1 to 2-3 function as time slave nodes and intermediate nodes (nodes that relay a received frame to an adjacent node) for the time synchronization. As shown in FIG. 1, each of the time slave nodes 2-1 to 2-3 is configured to include a time-synchronization control unit 21, RXs 22 and 24 each performing a predetermined reception process on a received frame, and TXs 23 and 25 each performing a predetermined transmission process such as framing of transmitted data.

The time slave node (time slave) 3 functions as a time slave node and an end point node (a node that terminates a received frame and does not relay the received frame to the adjacent node) for the time synchronization. As shown in FIG. 1, the time slave node 3 is constructed of a time-synchronization control unit 26, the RXs 22 and 24 each performing a predetermined receiving process on a received frame, and the TXs 23 and 25 each performing a predetermined transmission process such as framing of transmitted data.

Transmission paths 4-1 to 4-4 are those connecting adjacent nodes, and the adjacent nodes are connected to each other by two transmission paths having different directions of transmission and reception, respectively. Each of the time master node 1 and the time slave nodes 2-1 to 2-3 and 3 includes the two TXs and the two RXs. Each of the time slave nodes 2-1 to 2-3 that function as the intermediate nodes transmits and receives frames to/from the two adjacent nodes. For example, in the time slave node 2-1, the RX 22 and the TX 23 perform the processes for transmitting and receiving frames to/from the adjacent time master node 1 via the transmission path 4-1, and the RX 24 and the TX 25 perform the processes for transmitting and receiving frames to/from the other adjacent time slave node 2-2 via the transmission path 4-2.

With the configuration shown in FIG. 1, because the time master node 1 and the time slave node 3 are end point nodes, each has only one node adjacent thereto. The time master node 1 and the time slave node 3 can exclude the RX 12 and the TX 13 and the RX 24 and the TX 25 from their own configurations, respectively, because the RX 12 and TX 13 and the RX 24 and TX 25 do not perform the transmission and reception processes. In this example, the time master node 1 and the time slave node 3 are configured as shown in FIG. 1 so as to be identical in configuration to these nodes that function as the intermediate nodes.

In FIG. 1, constituent elements associated with clock synchronization of the time master node and the time slave nodes 2-1 to 2-3 and 3 are shown and constituent elements associated with other network functions or the like are omitted from the depiction.

Figure 2:
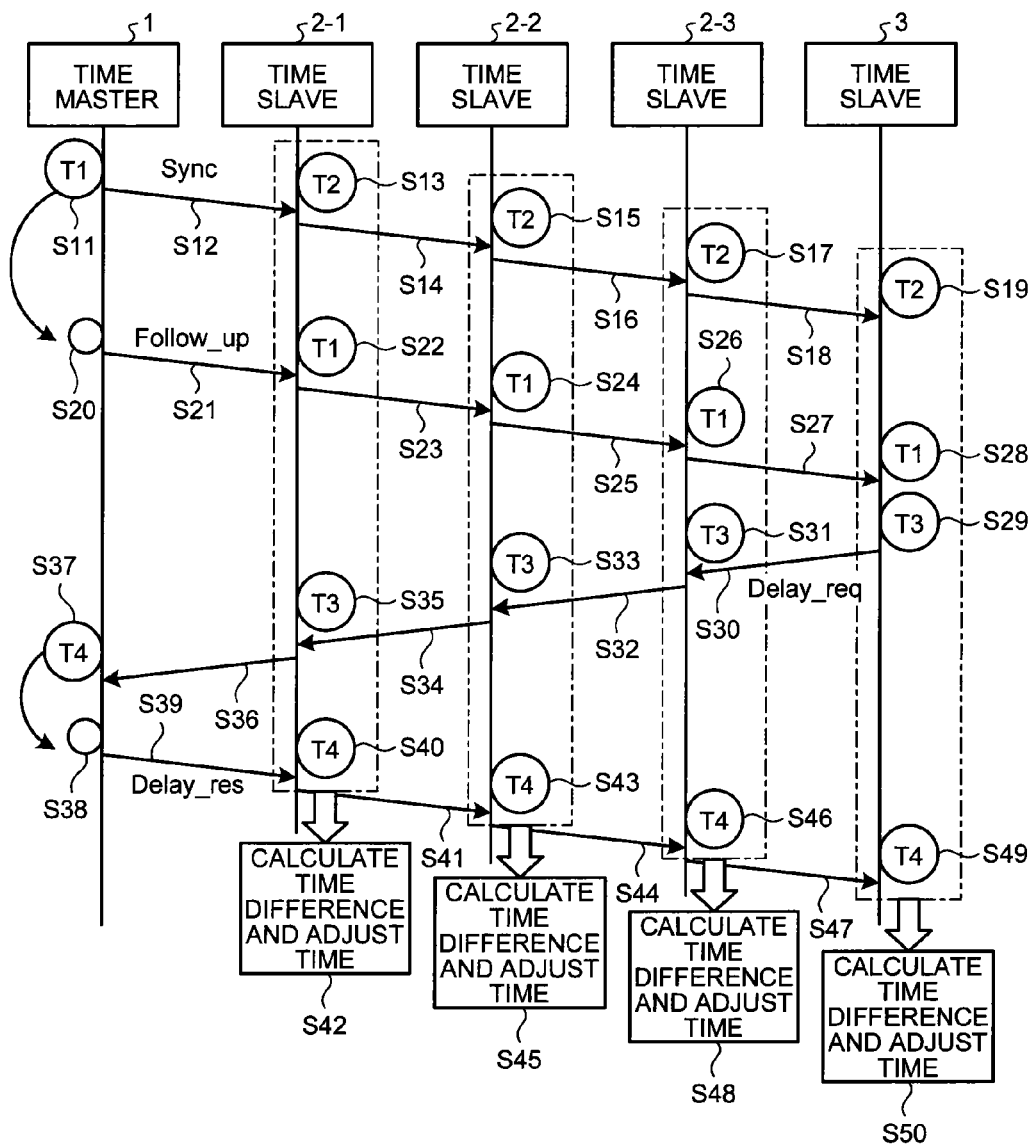
FIG. 2 is a chart showing an example of time synchronization procedures according to the first embodiment.

The time synchronization method according to the present embodiment is described next. FIG. 2 is a chart showing an example of time synchronization procedures according to the present embodiment. For the sake of brevity, in FIG. 2, the time master node 1 and the time slave nodes 2-1 to 2-3 and 3 are referred to as "time master 1" and "time slaves 2-1 to 2-3 and 3" with "node" being omitted, respectively.

In the time master node 1, the time-synchronization control unit 11 generates a Sync frame, and acquires and holds a time stamp T1 indicating a time of transmission of the Sync frame (Step S11), and transmits the Sync frame in a direction of an adjacent outward route (a direction from the time master node toward the time slave nodes 2-1 to 2-3 and 3) via the TX 15 (Step S12). Specifically, the TX 15 transmits the Sync frame to the adjacent time slave node 2-1. The Sync frame is a frame to be transmitted so that each time slave node can measure a time stamp indicating a time of reception at the time managed by the time slave node.

In the time slave node 2-1, the time-synchronization control unit 21 acquires and holds a time stamp T2 indicating a time (its own time) of reception of the Sync frame received via the RX 22 (Step S13), and relays the received Sync frame to the time slave node 2-2 via the TX 25 (Step S14).

Similarly, in each of the time slave nodes 2-2 and 2-3, the time-synchronization control unit 21 acquires and holds the time stamp T2 indicating a time of reception of the Sync frame received via the RX 22 (Steps S15 and S17), and relays the received Sync frame to the adjacent time slave node 2-3 or 3 via the TX 25 (Steps S16 and S18).

In the time slave node 3, the time-synchronization control unit 26 acquires and holds the time stamp T2 indicating a time of reception of the Sync frame received via the RX 22 (Step S19). With this process, transmission of the Sync frame in an outward-route direction is ended.

In the time master node 1, the time-synchronization control unit 11 generates a Follow_up frame for notifying each time slave node of the time stamp T1 indicating the time of transmission of the Sync frame held therein (Step S20), and transmits the Follow_up frame to the time slave node 2-1 via the TX 15 (Step S21).

In the time slave node 2-1, the time-synchronization control unit 21 extracts and holds the time stamp T1 stored in the Follow_up frame received via the RX 22 (Step S22), and relays the received Follow_up frame to the adjacent time slave node 2-2 via the TX 25 (Step S23).

Similarly, in each of the time slave nodes 2-2 and 2-3, the time-synchronization control unit 21 extracts and holds the time stamp T1 stored in the Follow_up frame received via the RX 22 (Steps S24 and S26), and relays the received Follow_up frame to the adjacent time slave node 2-3 or 3 via the TX 25 (Steps S25 and S27).

In the time slave node 3, the time-synchronization control unit 26 extracts and holds the time stamp T1 stored in the Follow_up frame received via the RX 22 (Step S28). With this process, the transmission of the Follow up frame in the outward-route direction is ended.

In the time slave node 3, the time-synchronization control unit 26 generates a Delay_req frame for measuring a propagation delay, and acquires and holds a time stamp T3 indicating a time of transmission of the Delay_req frame (Step S29), and transmits the Delay_req frame in a return-route direction (a direction toward the time master node 1) via the TX 23 (Step S30). Specifically, the TX 23 transmits the Delay_req frame to the time slave 2-3.

In the time slave node 2-3, when receiving the Delay_req frame via the RX 24, the time-synchronization control unit 21 relays the Delay_req frame. At this time, the time-synchronization control unit 21 holds the time stamp T3 indicating a time (its own time) of transmission of the Delay_req frame (Step S31), and transmits the Delay_req frame to the time slave node 2-2 via the TX 23 (Step S32).

Similarly, in each of the time slave nodes 2-2 and 2-1, when receiving the Delay_req frame via the RX 24, the time-synchronization control unit 21 holds the time stamp T3 indicating a time (its own time) of transmission of the Delay_req frame (Steps S33 and S35), and transmits the Delay_req frame to the time slave node 2-1 or the time master node 1 via the TX 23 (Steps S34 and S36).

When receiving the Delay_req frame via the RX 14, the time master node 1 acquires and holds a time stamp T4 indicating a time of reception of the Delay_req frame (Step S37). Then, the time master node 1 generates a Delay_res frame for noticing the held time stamp T4 (Step S38), and transmits the Delay_res frame to the time slave 2-1 via a TX 15 (Step S39).

In the time slave 2-1, the time-synchronization control unit 21 extracts and holds the time stamp T4 stored in the Delay_res frame received via the RX 22 (Step S40), and relays the received Delay_res frame to the adjacent time slave node 2-2 via the TX 25 (Step S41). Then, the time slave 2-1 calculates a time difference between its own time and a time of the time master node 1 (hereinafter, "master time") based on the time stamps T1 to T4 held therein, and adjusts its own time to the master time (Step S42).

Similarly, in each of the time slaves 2-2 and 2-3, the time-synchronization control unit 21 extracts and holds the time stamp T4 stored in the Delay_res frame received via the RX 22 (Steps S43 and S46), and relays the received Delay_res frame to the adjacent time slave node 2-3 or 3 via the TX 25 (Steps S44 and S47). Each of the time slaves 2-2 and 2-3 calculates a time difference between its own time and the master time based on the time stamps T1 to T4 held therein, and adjusts its own time to the master time (Steps S45 and S48).

In the time slave 3, the time-synchronization control unit 26 extracts and holds the time stamp T4 stored in the Delay_res frame received via the RX 22 (Step S49), calculates a time difference between its own time and the mater time based on the time stamps T1 to T4 held therein, and adjusts its own time to the master time (Step S50).

Next, a method of calculating the time difference between the own time and the master time, which is implemented by each of the time slaves 2-1 to 2-3 and 3, is described. Each of the time slave nodes is supposed to hold: the time (master time) T1 of transmission at which the time master node 1 has transmitted the Sync frame and the time (master time) T4 of reception at which the time master node 1 has received the Delay_req frame; and the time (its own time) T2 of reception at which the time slave node has received the Sync frame and the time (its own time) T3 of transmission at which the time slave node has transmitted the Delay_req frame.

A difference $\Delta T21$ between the times T2 and T1 includes not only a time difference $\Delta T$ between the master time and its own time but also a propagation delay $T_N$ from the time master node 1 to its own node. That is, $\Delta T21$ is represented by $\Delta T21 = \Delta T + T_N$. On the other hand, a difference $\Delta T43$ between the times T4 and T3 includes not only $-\Delta T$ but also a propagation delay $T_N'$ from its own node to the time master node 1. According to the IEEE 1588, the outward route and the return route are assumed to have the same propagation delay, so that $T_N'$ is set by $T_N' = T_N$ in this example. Therefore, $\Delta T43$ is represented by $\Delta T43 = -\Delta T + 2T_N$. Based on the relations described above, $\Delta T$ and $T_N$ can be calculated. Each slave node can synchronize its own time with the master time by the use of the calculated $\Delta T$.

As described above, according to the present embodiment, in each of the time slaves 2-1 to 2-3 serving as the intermediate nodes, the time-synchronization control unit 21 relays the received time synchronization frames (Sync frame, Follow_up frame, Delay_res frame, Delay_req frame), and acquires and holds the time stamps indicating the time of reception or the time of transmission at which the slave node has received or transmitted the time synchronization frame and the time of reception or the time of transmission at which the time master node 1 has received or transmitted the time synchronization frame depending on a type of the time synchronization frame. At a moment of acquiring the time stamps necessary for adjustment of the time difference, each of the time slaves 2-1 to 2-3 calculates the time difference based on those time stamps and adjusts its own time.

Figure 3:
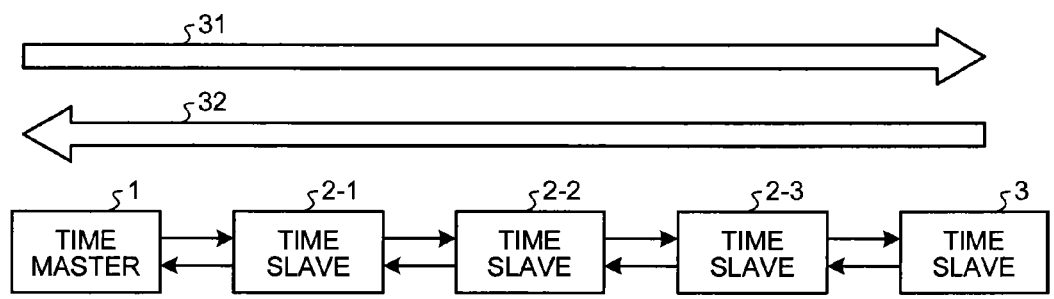
FIG. 3 is an illustration showing flows of time synchronization frames according to the first embodiment.

FIG. 3 is an illustration showing flows of the time synchronization frames in the case of a network configuration shown in FIG. 1. An outward route 31 indicates the flow of the time synchronization frames (Sync frame, Follow up frame and Delay_res frame), and a return route 32 indicates the flow of the time synchronization frame (Delay_req frame).

Figure 4:
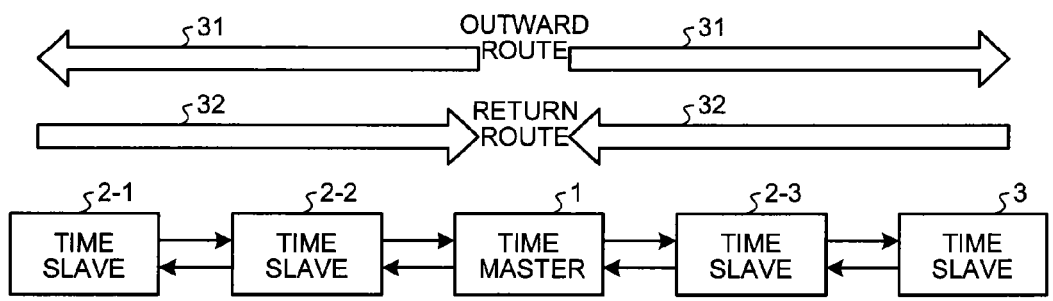
FIG. 4 is an illustration showing flows of time synchronization frames in the case where a time master node is located in an intermediate position in a network.

Furthermore, the time synchronization method according to the present embodiment can be also applied to a case where the time master node 1 is located in an intermediate position in the network differently from the network configuration shown in FIG. 1. FIG. 4 is an illustration showing flows of the time synchronization frames in a case where the time master node 1 is located in the intermediate position in the network. The outward route 31 indicates the flow of the time synchronization frames (Sync frame, Follow_up frame and Delay_res frame), and the return route 32 indicates the flow of the time synchronization frame (Delay_req frame).

In the case of a configuration shown in FIG. 4, the time master node 1 transmits the Sync frame, the Follow up frame and the Delay_res frame in both directions to the adjacent time slaves 2-3 and 2-2, and performs the same processes as in the time synchronization method described with reference to FIG. 2 with respect to each of the directions to the time slaves 2-3 and 2-2.

However, with the configuration shown in FIG. 4, not only the time slave node 3 but also the time slave node 2-1 serves as the end point node. Accordingly, the time slave node 2-1 is configured similarly to the time slave node 3. Alternatively, each of the time slave nodes 2-1 to 2-3 and 3 may include both the functions of the time-synchronization control units 21 and 26 so as to be able to function as both the intermediate node and the end point node.

Furthermore, in the case of FIG. 4, the time master node 1 is connected to the time slave nodes in the two directions from the time master node 1. However, the present invention is not limited thereto, and may adopt configuration as a star-formed network in which the time slave nodes are connected to the time master node in three directions. Also in this case, the time master node 1 transmits the time synchronization frames in the outward route in each of the directions, and the end point node in each of the directions transmits the time synchronization frame in the return route.

In the present embodiment, there is provided the time master node 1, but it is possible to perform time synchronization in the same manner as in the present embodiment by a configuration in which the end point node transmits the time synchronization frames in the outward route in place of the time master node 1 when a plurality of nodes constituting the communication system perform time synchronization without the time master node.

In the present embodiment, the intermediate nodes other than the end point nodes are also intended to perform the time synchronization, but alternatively, the time synchronization method according to the present embodiment may be applied to the case where the end point nodes are subjected to the time synchronization. In this situation, all the intermediate nodes have to do is relay the received time synchronization frames, and any processes for acquiring the time stamps are not necessary.

In the present embodiment, the time-synchronization control unit 21 performs both the relay of the time synchronization frames and the processes associated with the time synchronization. Alternatively, the time-synchronization control unit 21 may be configured to be divided into two units, that is, a relay unit that relays the time synchronization frames and a time synchronizing unit that performs processes associated with the time synchronization.

As described above, in the present embodiment, the time master node 1 transmits the time synchronization frame in the outward route for the time synchronization, and the time slave node 3 serving as the end point node transmits the time synchronization frame in the return route. The time slave nodes 2-1 to 2-3 serving as the intermediate nodes relay the received time synchronization frames to the adjacent nodes, and acquire and hold the predetermined time stamps based on a type of the time synchronization frame. Furthermore, at the moment of acquiring the time stamps necessary for the adjustment of the time differences, the time slave node 3 that serves as the end point node and the time slave nodes 2-1 to 2-3 calculate the time differences based on these time stamps and adjust their own times.

Accordingly, the intermediate nodes can commonly use the time synchronization frame transmitted by the time master node 1 or the time slave node 3 that serves as the end point. Furthermore, the intermediate nodes acquire necessary information simultaneously with performing a relay operation. Therefore, it is possible to reduce the amount of time required until arrival of the time synchronization frames. Furthermore, the intermediate nodes do not need to function as the time master node, and thus it is unnecessary to make the time slave nodes multifunctional ones. Furthermore, only the process for transmitting the time synchronization frames from one end point to the other end point enables the respective time slave nodes to acquire the time stamps necessary for the time synchronization substantially simultaneously, so that the used band can be saved and the synchronization completion time can be shortened.

Second Embodiment

Figure 5:
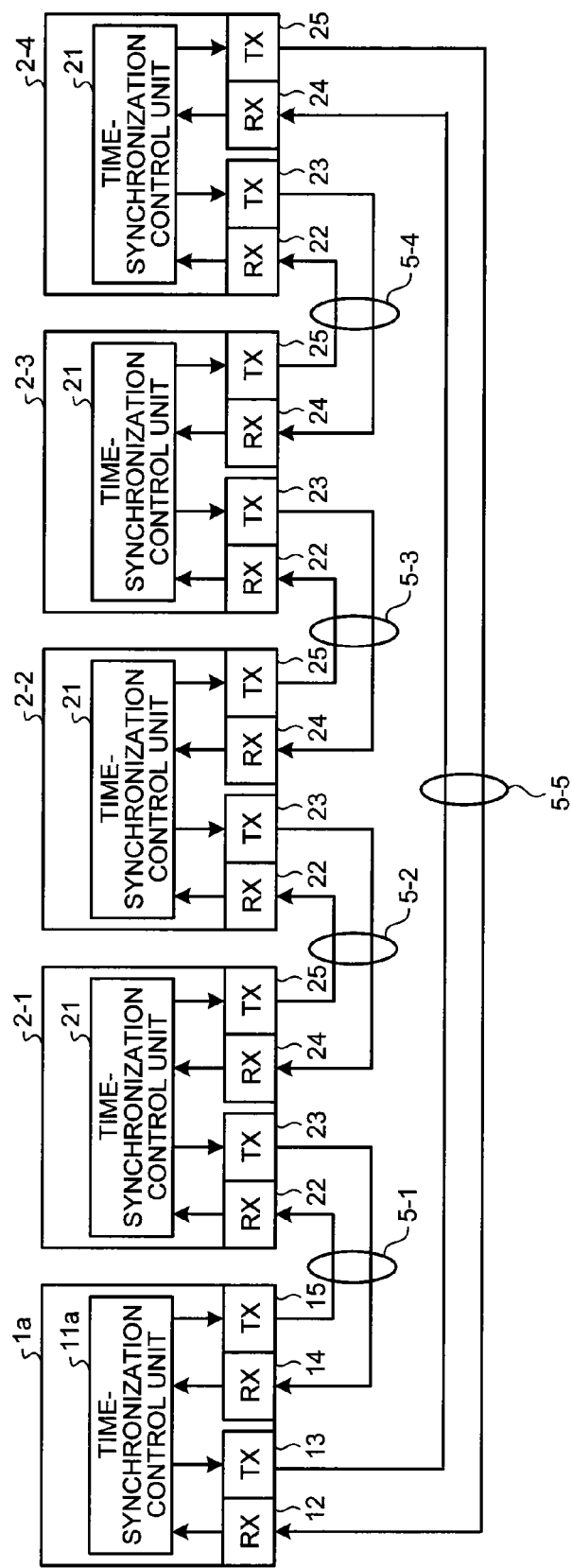
FIG. 5 is a diagram showing a configuration example of a communication system according to a second embodiment.

FIG. 5 is a diagram showing a configuration example of a communication system according to a second embodiment of the present invention. As shown in FIG. 5, the communication system according to the present embodiment constitutes a ring network (double rings) of a five-node configuration, and is configured to include a time master node 1a and time slave nodes 2-1 to 2-4. The time slave nodes 2-1 to 2-4 are identical in configuration to the time slave nodes 2-1 to 2-3 and 3 according to the first embodiment. Constituent elements having functions identical to those of the first embodiment are denoted by reference signs identical to those in the first embodiment, and explanation thereof will be omitted.

The time master node 1a is identical to the time master node 1 according to the first embodiment except that a time-synchronization control unit 11a replaces the time-synchronization control unit 11. Transmission paths 5-1 to 5-5 are transmission paths connecting between the adjacent nodes. The adjacent nodes are connected to each other by two transmission paths having different directions of transmission and reception.

In the present embodiment, similarly to the first embodiment, description is given for an example of a time synchronization method using the protocol specified under IEEE 1588. However, this does not lead to limitation, and as long as a protocol is for the time synchronization method in which the outward route and the return route are dealt with as the same route and predetermined time stamps are acquired using the time synchronization frames, any protocols can be applied to the present embodiment.

Figure 6:
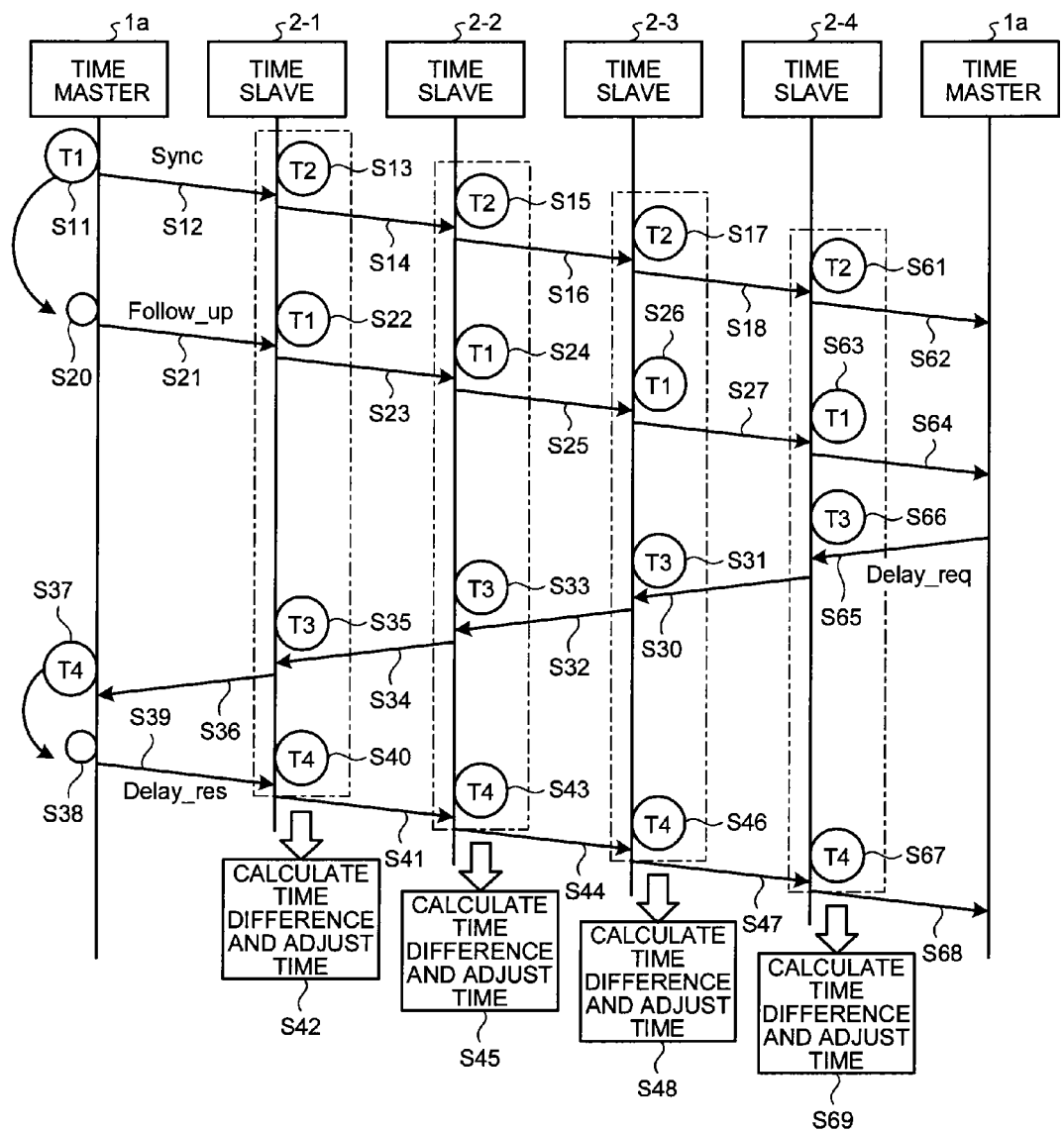
FIG. 6 is a chart showing an example of time synchronization procedures according to the second embodiment.

An operation according to the present embodiment is explained next. FIG. 6 is a chart showing an example of time synchronization procedures according to the present embodiment. For the sake of brevity, in FIG. 6, the time master node 1a and the time slave nodes 2-1 to 2-4 are referred to as "time master 1a" and "time slaves 2-1 to 2-4" while omitting "node", respectively.

First, the time master node 1a transmits a Sync frame. Processes at Steps S11 to S18 are the same as Steps S11 to S18 of the first embodiment. However, at Step S18, the time slave node 2-3 relays the Sync frame to the time slave 2-4. In the case of a ring network, a route in either direction may be set as the outward route, but in the present embodiment, the route from the time master node 1a via the time slave nodes 2-1, 2-2, 2-3 and 2-4 in this order back to the time master node 1a is set as an outward route, and a route opposite thereto is set as a return route.

In the time slave 2-4, similarly to the time slaves 2-1 to 2-3 of the first embodiment, the time-synchronization control unit 21 acquires and holds the time stamp T2 indicating the time of reception of the Sync frame received via the RX 22 (Step S61), and relays the received Sync frame to the adjacent time master node 1a via the TX 25 (Step S62). The time master node 1a receives the Sync frame, but does not perform any special processes.

The time master node 1a transmits the Follow_up frame. Steps S20 to S27 are the same as steps S20 to S27 of the first embodiment. In the time slave node 2-4, the time-synchronization control unit 21 extracts and holds the time stamp T1 stored in the Follow_up frame received via the RX 22 (Step S63), and relays the received Follow_up frame to the adjacent time master node 1a via the TX 25 (Step S64).

Next, in the time master node 1a, a time-synchronization control unit 21agenerates the Delay_req frame to be transmitted in the return-route direction, and transmits the Delay_req frame to the time slave node 2-4 adjacent thereto in the return-route direction (Step S65). In this case, the time master node 1a does not need to acquire a time stamp indicating the time of transmission because the time master node 1a does not need to adjust the time difference.

In the time slave node 2-4, when receiving the Delay_req frame via the RX 24, the time-synchronization control unit 21 holds the time stamp T3 indicating the time (its own time) of transmission of the Delay_req frame (Step S66), and transmits the Delay_req frame to the time slave node 2-3 via the TX 23 (Step S30).

Since then, Steps S31 to S48 are the same as Steps S31 to S48 of the first embodiment. However, at Step S47, the time slave node 2-3 relays the Delay_res frame to the time slave node 2-4.

In the time slave node 2-4, the time-synchronization control unit 21 extracts and holds the time stamp T4 stored in the Delay_res frame received via the RX 22 (Step S67), and relays the received Delay_res frame to the adjacent time master node 1avia the TX 25 (Step S68). The time slave node 2-4 calculates the time difference between its own time and the master time based on the time stamps T1 to T4 held by the time slave node 2-4, and adjusts its own time to the master time (Step S69). Operations of the present embodiment other than those described above are identical to those of the first embodiment.

Figure 7:
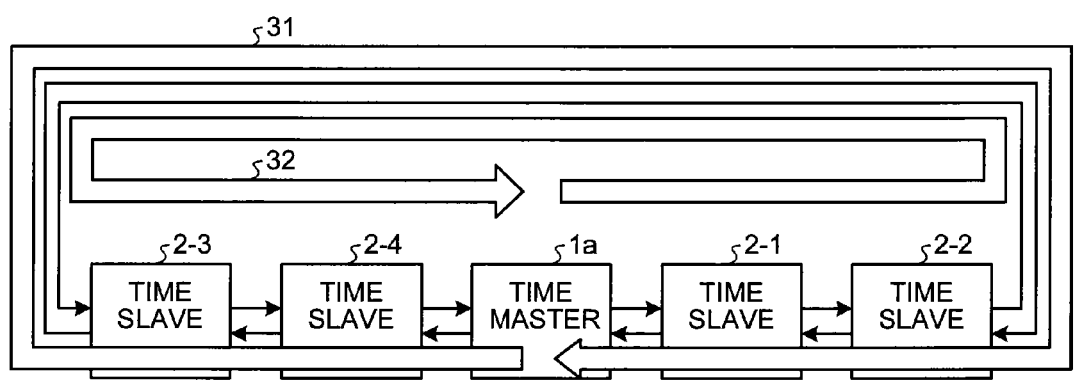
FIG. 7 is an illustration showing flows of time synchronization frames according to the second embodiment.

FIG. 7 is an illustration showing flows of the time synchronization frames according to the present embodiment. As shown in FIG. 7, in the present embodiment, the time synchronization frames in the outward-route direction are transmitted in the direction of the outward route 31, and the time synchronization frame in the return-route direction is transmitted in the direction of the return route 32.

In this way, when the ring network is constructed, the time master node 1a transmits the time synchronization frames in the outward route for the time synchronization in the outward-route direction, and the time master node 1a also transmits the time synchronization frame in the return route in the return-route direction. The time slave nodes 2-1 to 2-4 serving as the intermediate nodes relay the received time synchronization frames to the adjacent nodes, and acquire and hold the predetermined time stamps based on the types of the time synchronization frames. Furthermore, at the moment of acquiring the time stamps necessary for the adjustment of the time differences, the time slave nodes 2-1 to 2-4 calculate the time differences based on those time stamps and adjust their own times. Accordingly, the communication system that constitutes the ring network can also acquire the same advantageous effects as in to the first embodiment. Further, the time slave nodes 2-1 to 2-4 do not need to include the function as the end point node.

Third Embodiment

Figure 8:
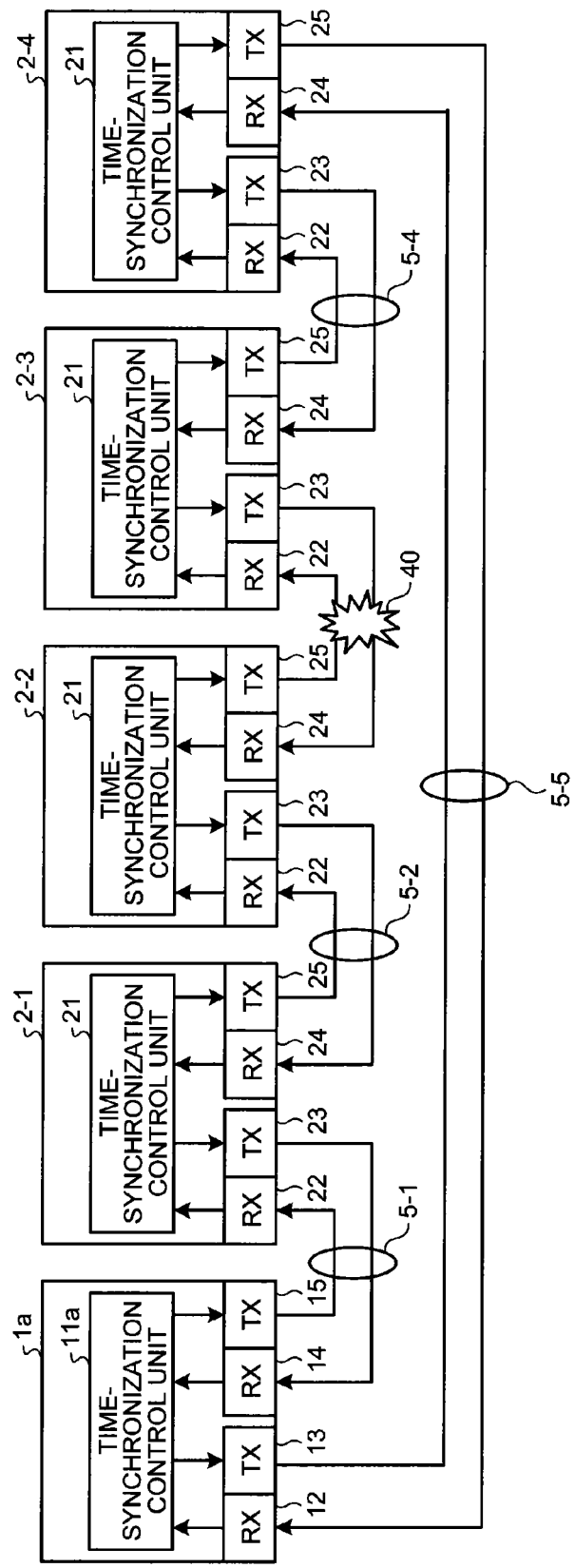
FIG. 8 is a diagram showing a configuration example of a communication system according to a third embodiment.

FIG. 8 is a diagram showing a configuration example of a communication system according to a third embodiment of the present invention. As shown in FIG. 8, the communication system according to the present embodiment is identical in configuration to the communication system according to the second embodiment, but it is assumed that a transmission path failure 40 has occurred in the transmission path 5-3. However, each of the time slaves 2-1 to 2-4 has both a function as the intermediate node and a function as the end point node. That is, it is assumed that the time-synchronization control unit 21 according to the present embodiment also functions as the time-synchronization control unit 26. Constituent elements having functions equivalent to those in the first and second embodiments are denoted by reference signs identical to those in the first and second embodiments and explanations thereof will be omitted.

Figure 9:
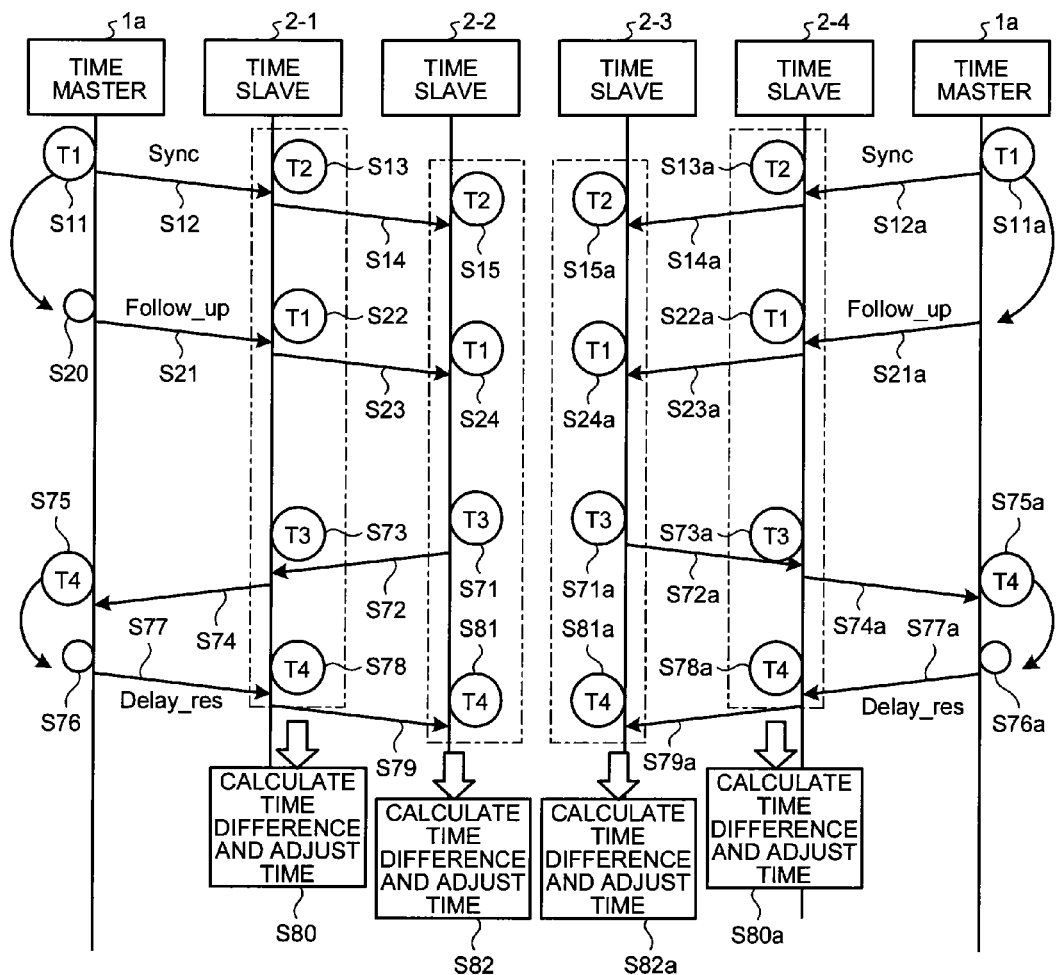
FIG. 9 is a chart showing an example of time synchronization procedures according to the third embodiment.

An operation according to the present embodiment is explained next. It is assumed that the communication system operates similarly to the second embodiment when there is no transmission path failure 40, and that the communication system performs the following operation when the transmission path failure 40 has occurred. FIG. 9 is a chart showing an example of time synchronization procedures according to the present embodiment. For the sake of brevity, in FIG. 9, the time master node 1a and the time slave nodes 2-1 to 2-4 are referred to as "time master 1a" and "time slaves 2-1 to 2-4" while omitting "node", respectively.

When the transmission path failure 40 has occurred, the ring network shown in FIG. 8 can be regarded as two line networks, that is, a line network from the time master node 1a to the time slave node 2-2 and a line network from the time master node 1a to the time slave node 2-3. Therefore, this configuration is equivalent to the example shown in FIG. 4 according to the first embodiment, and it suffices to perform the same time synchronization method as in the first embodiment in each line network.

First, similarly to the first embodiment, Steps S11 to S15 are performed. When the time master node 1a transmits the Sync frame to the time slave node 2-1 at Step S12, the time master node 1a simultaneously transmits the Sync frame to the time slave node 2-4 (Step S12a). In this case, both the direction from the time master node 1a to the time slave node 2-2 and the direction from the time master node 1a to the time slave node 2-3 are outward-route directions.

In the time slave node 2-4, the time-synchronization control unit 21 acquires and holds the time stamp T2 indicating the time of reception of the Sync frame received via the RX 24 (Step S13a), and relays the received Sync frame to the adjacent time master slave node 2-3 via the TX 23 (Step S14a). In the time slave node 2-3, the time-synchronization control unit 26 acquires and holds the time stamp T2 indicating the time of reception of the Sync frame received via the RX 24 (Step S15a).

Similarly to the first embodiment, Steps S20 to S24 are performed. When the time master node 1a transmits the Follow_up frame to the time slave node 2-1 at Step S21, the time master node 1a simultaneously transmits the Follow_up frame to the time slave node 2-4 (Step S21a).

In the time slave node 2-4, the time-synchronization control unit 21 extracts and holds the time stamp T1 stored in the Follow_up frame received via the RX 24 (Step S22a), and relays the received Follow_up frame to the adjacent time slave node 2-3 via the TX 23 (Step S23a).

In the time slave node 2-3, the time-synchronization control unit 21 extracts and holds the time stamp T1 stored in the Follow_up frame received via the RX 24 (Step S24a).

Next, the time slave node 2-2 that serves as the end point node acquires and holds the time stamp T3 indicating the time of transmission of the Delay_req frame (Step S71), and transmits the Delay_req frame in the return-route direction (a direction toward the time master node 1a) via the TX 23 (Step S72). Specifically, the TX 23 transmits the Delay_req frame to the time slave 2-1.

The time slave node 2-3 that serves as the endpoint node acquires and holds the time stamp T3 indicating the time of transmission of the Delay_req frame (Step S71a), and transmits the Delay_req frame in the return-route direction (a direction toward the time master node 1a) via the TX 25 (Step S72a). Specifically, the TX 25 transmits the Delay_req frame to the time slave 2-4.

In the time slave node 2-1, when the time-synchronization control unit 21 receives the Delay_req frame via the RX 24, the time-synchronization control unit 21 holds the time stamp T3 indicating the time of transmission of the Delay_req frame (Step S73), and transmits the Delay_req frame to the time master node 1a via the TX 23 (Step S74).

When receiving the Delay_req frame via the RX 14, the time master node 1a acquires and holds the time stamp T4 indicating the time of reception of the Delay_req frame (Step S75). Then, the time master node 1a generates the Delay_res frame for noticing the time stamp T4 held therein (Step S76), and transmits the Delay_res frame to the time slave 2-1 via the TX 11 (Step S77).

In the time slave 2-1, the time-synchronization control unit 21 extracts and holds the time stamp T4 stored in the Delay_res frame received via the RX 22 (Step S78), and relays the received Delay_res frame to the adjacent time slave node 2-2 via the TX 25 (Step S79). Furthermore, the time slave 2-1 calculates the time difference between its own time and the master time based on the time stamps T1 to T4 held by the time slave 2-1, and adjusts its own time to the master time (Step S80).

In the time slave 2-2, the time-synchronization control unit 21 extracts and holds the time stamp T4 stored in the Delay_res frame received via the RX 22 (Step S81). Furthermore, the time slave 2-2 calculates the time difference between its own time and the master time based on the time stamps T1 to T4 held by the time slave 2-2, and adjusts its own time to the master time (Step S82).

In the time slave node 2-4, when the time-synchronization control unit 21 receives the Delay_req frame via the RX 22, the time-synchronization control unit 21 holds the time stamp T3 indicating the time of transmission of the Delay_req frame (Step S73a), and transmits the Delay_req frame to the time master node 1 via the TX 25 (Step S74a).

When receiving the Delay_req frame via the RX 12, the time master node 1 acquires and holds the time stamp T4 (having a value independent of that of the time stamp T4 having been acquired at Step S75) indicating the time of reception of the Delay_req frame (Step S75a). Then, the time master node 1 generates the Delay_res frame for noticing the time stamp T4 held therein (Step S76a), and transmits the Delay_res frame to the time slave 2-4 via the TX 13 (Step S77a).

In the time slave 2-4, the time-synchronization control unit 21 extracts and holds the time stamp T4 stored in the Delay_res frame received via the RX 24 (Step S78a), and relays the received Delay_res frame to the adjacent time slave node 2-3 via the TX 23 (Step S79a). Furthermore, the time slave 2-4 calculates the time difference between its own time and the master time based on the time stamps T1 to T4 held therein, and adjusts its own time to the master time (Step S80a).

Figure 10:
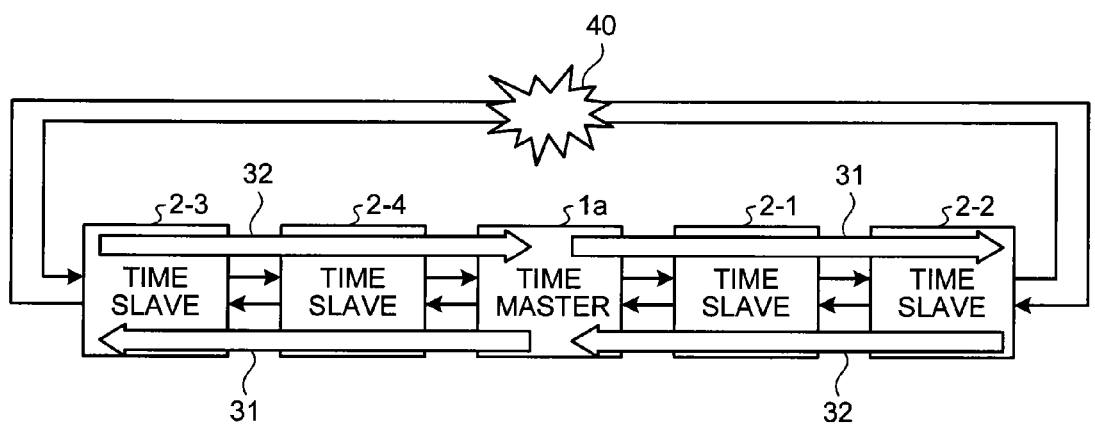
FIG. 10 is an illustration showing flows of time synchronization frames according to the third embodiment.

FIG. 10 is an illustration showing flows of the time synchronization frames according to the present embodiment. As shown in FIG. 10, in the present embodiment, when the transmission path failure 40 has occurred, the time synchronization frames in the outward-route direction are transmitted in the direction of the outward route 31, and the time synchronization frames in the return-route direction are transmitted in the direction of the return route 32.

In the time slave 2-3, the time-synchronization control unit 21 extracts and holds the time stamp T4 stored in the Delay_res frame received via the RX 24 (Step S81a). Furthermore, the time slave 2-3 calculates the time difference between its own time and the master time based on the time stamps T1 to T4 held therein, and adjusts its own time to the master time (Step S82a). Operations of the present embodiment other than those described above are identical to those of the first embodiment.

In this way, according to the present embodiment, in the case where the ring network is constructed, when the transmission path failure 40 has occurred, the two nodes adjacent to a failure location of the transmission path failure 40 are set as the end point nodes, and the same time synchronization method as in the first embodiment is intentionally performed in the two line networks, that is, a line network including the time master node 1a and one of the end point nodes and a line network including the time master node 1a and another of the end point nodes. Therefore, even when the transmission path failure 40 has occurred in the ring network, it is possible to attain the same advantageous effects as in the first embodiment.

Fourth Embodiment

A time synchronization method for a communication system according to a fourth embodiment of the present invention is described next. The communication system according to the present embodiment has the same configuration as that according to the second or third embodiment. In the first to third embodiments, the time synchronization frames are transmitted independently. On the other hand, in the present embodiment, when ERP (Ethernet (registered trademark) Ring Protection, ITU-T G. 8032) or RPR (Resilient Packet Ring, IEEE 802.17) is applied as a ring control protocol in the ring network, time synchronization information set for a time synchronization frame is transmitted while piggybacking on the ring control protocol.

According to the both ERP and RPR protocols, a control frame for protection is periodically circulated. In the present embodiment, time synchronization information including the same information as that in the time synchronization frame is stored in an R-APS (Ring-Automatic Protection Switching) frame according to the ERP or a TP (Topology and Protection) frame according to the RPR and transmitted. In this case, outward and return routes for R-APS frames or TP frames match those for the time synchronization whether the ring is normal or fault. Therefore, it is possible to transmit the information similarly to the case of transmitting the time synchronization frames independently.

As described above, according to the present embodiment, the time synchronization information to be set to the time synchronization frame is allowed to piggyback on the control frame for the ring control protocol and transmitted. Therefore, as compared to the second and third embodiments, the present embodiment can achieve further reduction of a used band.

INDUSTRIAL APPLICABILITY

As described above, the communication system, the communication apparatus and the time synchronization method according to the present invention are useful for a communication system that performs time synchronization among a plurality of communication apparatuses, and are particularly suitable for a communication system in which time synchronization is performed between a time master node and a plurality of time slave nodes.

REFERENCE SIGNS LIST

1, 1a TIME MASTER NODE
2-1 to 2-4, 3 TIME SLAVE NODE
4-1 to 4-4, 5-1 to 5-5 TRANSMISSION PATH
12, 14, 22, 24 RX
13, 15, 23, 25 TX
11, 11a, 21, 26 TIME-SYNCHRONIZATION CONTROL UNIT
31 OUTWARD ROUTE
32 RETURN ROUTE
40 TRANSMISSION PATH FAILURE

The invention claimed is:

1. A communication system performing time synchronization using a time synchronization frame transmitted in an outward-route direction and a return-route direction, the communication system comprising:
a plurality of communication apparatuses, wherein
the communication apparatuses constitute a ring network,
one of the communication apparatuses that constitute the ring network is set as a starting point node, and one or more communication apparatuses among the communication apparatuses are set as terminal point nodes,
the starting point node includes a starting-point-node transmitting unit that generates a time synchronization frame in an outward-route direction, and transmits the generated time synchronization frame in both directions of the ring network, and a time-information noticing unit that notices, to an intermediate node and the terminal point nodes, time information related to a time of transmission at which the time synchronization frame in the outward-route direction is transmitted and a time of reception at which a time synchronization frame in the return-route direction transmitted from the terminal point nodes is received,
each of the one or more terminal point nodes includes a terminal-point-node transmitting unit that generates a time synchronization frame in the return-route direction, and transmits the generated time synchronization frame in a return-route direction,
the intermediate node is a communication apparatus among the communication apparatuses other than the starting point node and the terminal point nodes and includes a relay unit that relays a received time synchronization frame to an adjacent node when receiving the time synchronization frame transmitted in the outward-route direction and when receiving the time synchronization frame transmitted in the return-route direction, and
the intermediate node performs time synchronization of its own communication apparatus based on the time information noticed by the starting point node, a time of reception at which the time synchronization frame transmitted from the starting point node is received, and a time of transmitting at which the intermediate node relays a time synchronization frame transmitted from the terminal point nodes.

2. The communication system according to claim 1, wherein
when a transmission path failure is detected on the ring network,
two communication apparatuses among the communication apparatuses that are adjacent to a location in which the transmission path failure is detected are set as the terminal point nodes.

3. The communication system according to claim 2, wherein when a transmission path failure has occurred on the ring network, the terminal point node performs time synchronization with the starting point node based on a predetermined time synchronization sequence, based on a time synchronization frame in an outward-route direction and a return-route direction.

4. The communication system according to claim 1, wherein the starting point node is set as a time master node, and the communication apparatus other than the time master node is set as a time slave node.

5. The communication system according to claim 1, wherein the starting point node and the terminal point node transmit information included in a time synchronization frame while storing the information in a control frame transmitted regularly so as to control the ring network.

6. The communication system according to claim 5, wherein the control frame is an R-APS frame according to ERP or a TP frame according to RPR.

7. The communication system according to claim 1, wherein
the communication system performs time synchronization based on IEEE 1588, and
a time synchronization frame in an outward-route direction is any of a Sync frame, a Follow_up frame and a Delay_res frame, and a time synchronization frame in a return-route direction is a Delay_req frame.

8. The communication system according to claim 1, wherein the intermediate node acquires predetermined time synchronization information based on a received time synchronization frame, holds the time synchronization information, and performs time synchronization based on the held time synchronization information after completion of acquiring the time synchronization information necessary for the time synchronization.

9. The communication system according to claim 8, wherein
the communication system performs time synchronization based on IEEE 1588,
a time synchronization frame in an outward-route direction is any of a Sync frame, a Follow_up frame and a Delay_res frame, and a time synchronization frame in a return-route direction is a Delay_req frame,
the intermediate node acquires its own time at which the intermediate node receives the Sync frame as the time synchronization information when receiving the Sync frame, acquires a time of transmission of the Sync frame in the starting point node included in the Follow_up frame as the time synchronization information when receiving the Follow_up frame, acquires its own time at which the Delay_req frame is transmitted as the time synchronization information when receiving the Delay_req frame, and acquires a time of reception of the Delay_req frame in the starting point node included in the Delay_res frame as the time synchronization information when receiving the Delay_res frame.

10. The communication system according to claim 1, wherein the intermediate node is configured to relay the received time synchronization frame to the adjacent node without performing any processes for acquiring a time stamp, when receiving the time synchronization frame transmitted in the outward-route direction or the return-route direction.

11. A communication apparatus applicable to a communication system, the communication system being constituted by a plurality of communication apparatuses and performing time synchronization using a time synchronization frame transmitted in an outward-route direction and a return-route direction,
the communication apparatuses constituting a ring network, one of the communication apparatuses being set as a starting point node, at least two communication apparatuses among the communication apparatuses being set as terminal point nodes, each of the communication apparatuses other than the starting point node and the terminal point nodes being set as an intermediate node, the intermediate node performing time synchronization based on the time synchronization frame transmitted from the starting point node and the terminal point nodes, wherein
time synchronization of the communication apparatus is performed based on time information, which is noticed by the starting point node, related to a time of transmission in the starting point node, at which a time synchronization frame in the outward-route direction is transmitted and a time of reception in the starting point node, at which a time synchronization frame in the return-route direction transmitted from the terminal point nodes is received, a time of reception at which a time synchronization frame transmitted from the starting point node is received, and a time of transmitting at which the communication apparatus relays a time synchronization frame transmitted from the terminal point nodes, and
when a failure is detected on a transmission path between the communication apparatus and the adjacent communication apparatus adjacent to the communication apparatus itself on the ring network, the communication apparatus operates as a terminal point node that terminates a time synchronization frame in an outward-route direction transmitted from the starting point node and transmits a time synchronization frame in a return-route direction to the starting point node via the intermediate node which relays a received time synchronization frame to an adjacent node.

12. The communication apparatus according to claim 11, wherein the intermediate node is configured to relay the received time synchronization frame to the adjacent node without performing any processes for acquiring a time stamp, when receiving the time synchronization frame transmitted in the outward-route direction or the return-route direction.

13. A time synchronization method for a communication system, the communication system being constituted by a plurality of communication apparatuses and performing time synchronization using a time synchronization frame transmitted in an outward-route direction and a return-route direction, wherein
the communication apparatuses constitute a ring network,
one of the communication apparatuses that constitute the ring network is set as a starting point node, and one or more communication apparatuses among the communication apparatuses are set as terminal point nodes,
the time synchronization method comprises:
an outward-route-frame transmitting step of causing the starting point node to generate a time synchronization frame in an outward-route direction, and to transmit the generated time synchronization frame in both directions of the ring network,
a return-route-frame transmitting step of causing each of the one or more terminal point nodes to generate a time synchronization frame in a return-route direction, and to transmit the generated time synchronization frame in the return-route direction,
a relay step of causing an intermediate node that is a communication apparatus among the communication apparatuses other than the starting point node and the terminal point nodes to relay a received time synchronization frame to an adjacent node when the intermediate node receives the time synchronization frame transmitted in an outward-route direction and when the intermediate node receives the time synchronization frame transmitted in the return-route direction,
a time-information noticing step of causing the starting point node to notice, to the intermediate node and the terminal point nodes, time information related to a time of transmission at which a time synchronization frame in the outward-route direction is transmitted and a time of reception at which a time synchronization frame in the return-route direction transmitted from the terminal point nodes is received, and a time-synchronization step of causing the intermediate node to perform time synchronization of its own communication apparatus based on time information noticed by the starting point node, a time of reception at which the time synchronization frame in the return-route direction transmitted from the starting point node is received, and a time of transmission at which the intermediate node relays a time synchronization frame transmitted from the terminal point nodes.

14. The communication method according to claim 13, wherein the relay step causes the intermediate node to relay the received time synchronization frame to the adjacent node without performing any processes for acquiring a time stamp, when receiving the time synchronization frame transmitted in the outward-route direction or the return-route direction.

* * * * *